United States Patent [19]
Gill et al.

[11] 3,942,905
[45] Mar. 9, 1976

[54] TREPANNING AND BORING TOOL

[75] Inventors: Geoffrey Gill, Grand Haven; Donald W. Pratt, Muskegon; Bryant W. Green, Whitehall, all of Mich.

[73] Assignee: Muskegon Tool Industries, Muskegon, Mich.

[22] Filed: Feb. 11, 1975

[21] Appl. No.: 549,075

[52] U.S. Cl. .................. 408/204; 408/20; 408/197; 408/239 A; 408/703
[51] Int. Cl.² ............... B23B 41/02; B23B 51/04
[58] Field of Search .......... 408/204, 206, 207, 703, 408/20, 239, 223, 227, 197, 200, 205

[56] References Cited
UNITED STATES PATENTS

| 1,780,325 | 11/1930 | Williams | 408/703 X |
| 3,308,689 | 3/1967 | MacDonald | 408/703 X |

*Primary Examiner*—Travis S. McGehee
*Attorney, Agent, or Firm*—Glenn B. Morse

[57] ABSTRACT

A trepanning tool is adapted to receive attachments for performing boring operations on trepanned holes. The attachments interengage with the trepanning unit to establish a boring diameter concentric with, and adjustable with respect to, the trepanned diameter without removing the trepanning cutter.

7 Claims, 25 Drawing Figures

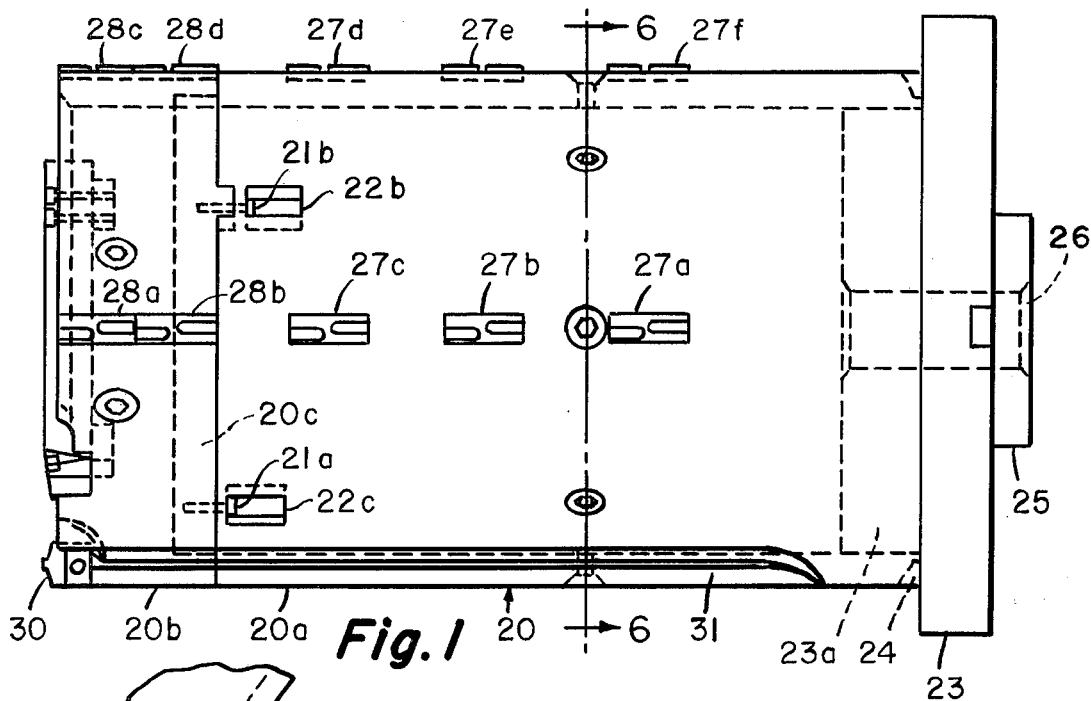
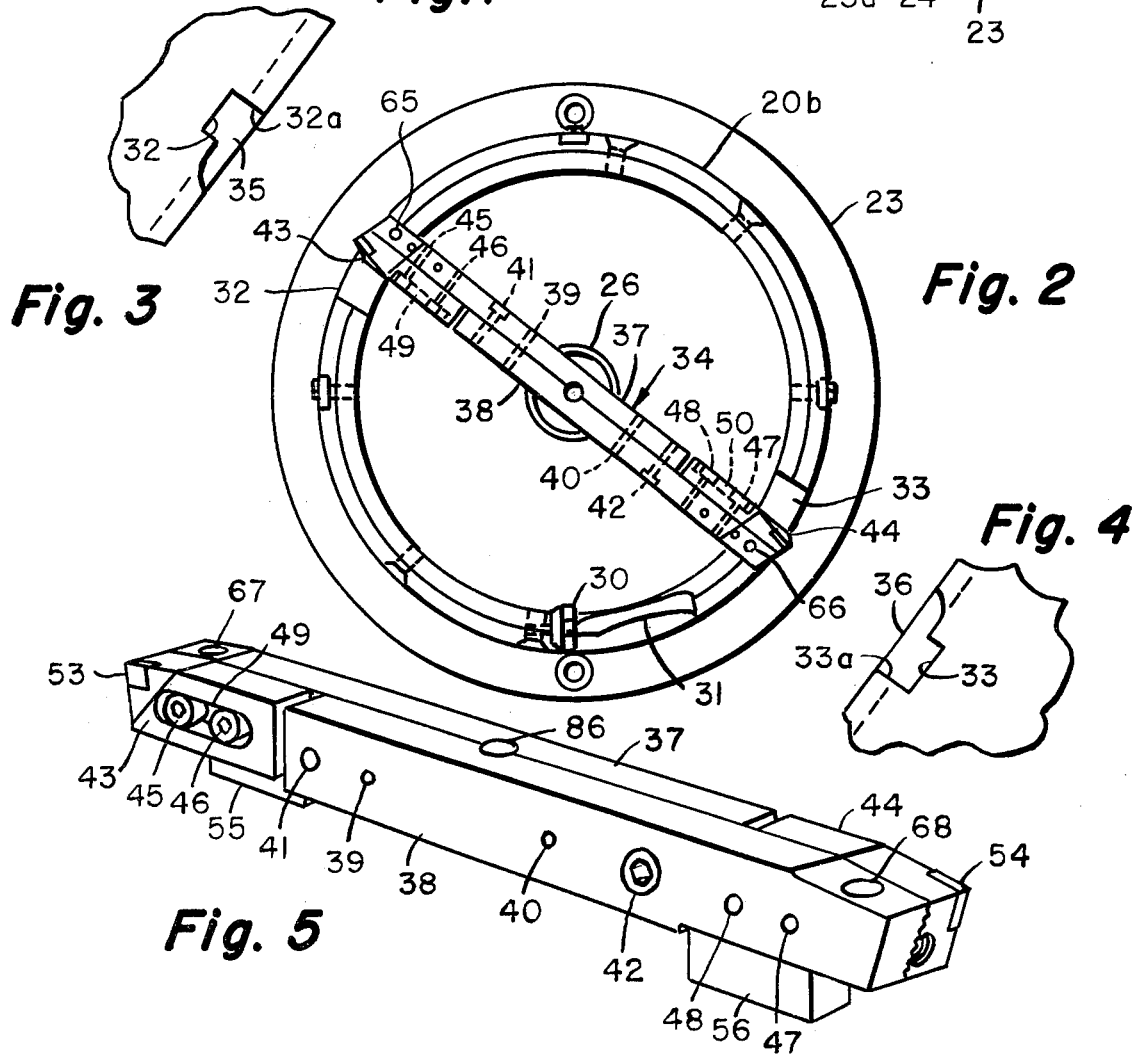

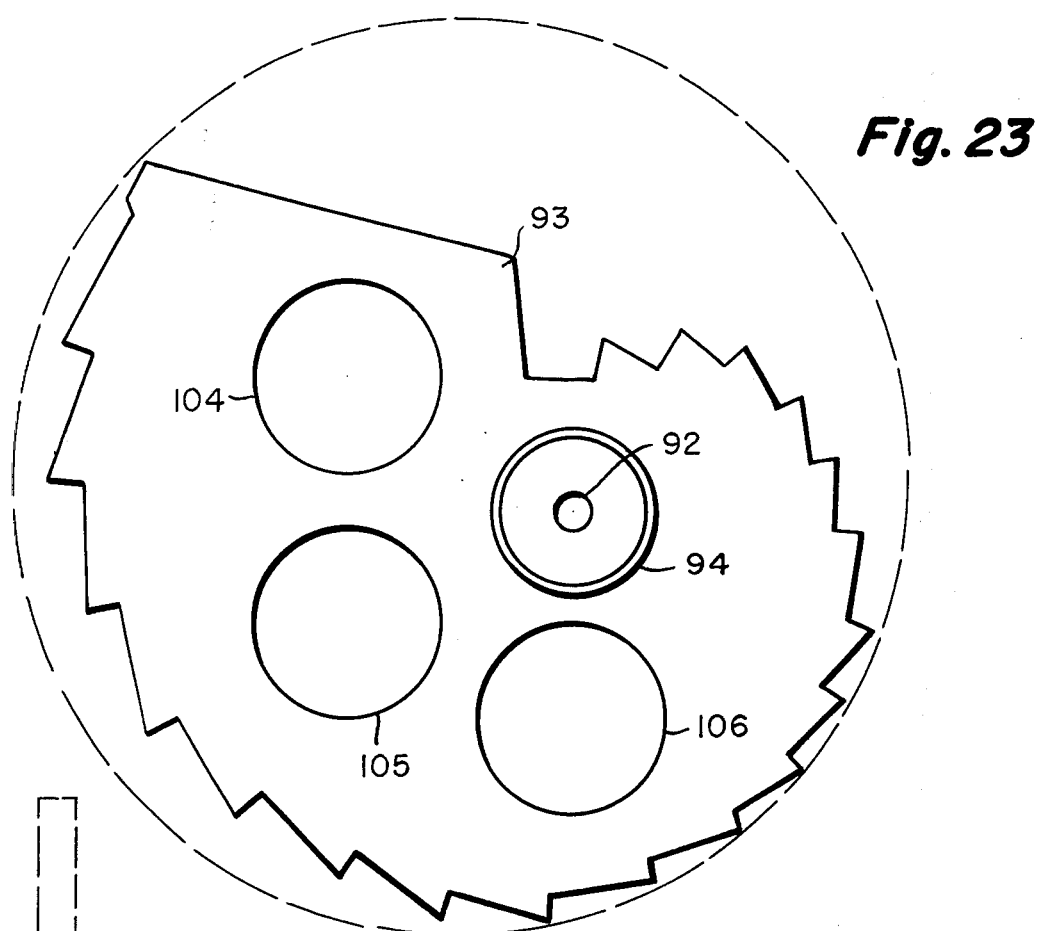
Fig. 23
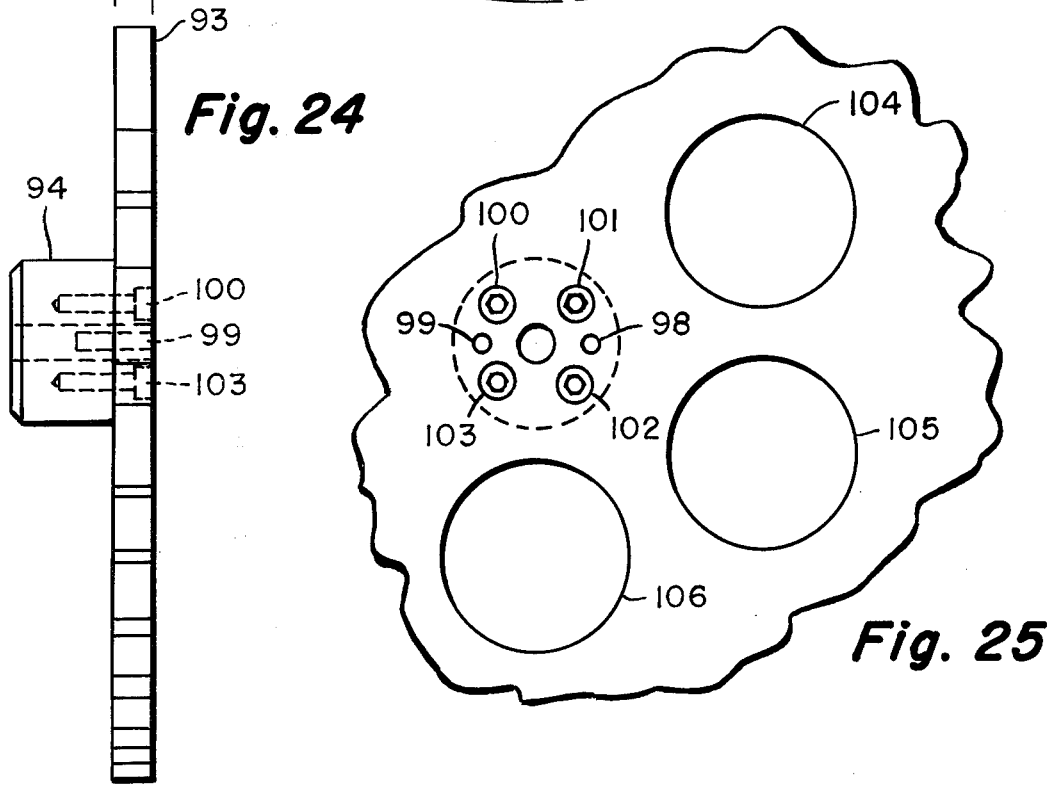
Fig. 24
Fig. 25

TREPANNING AND BORING TOOL

BACKGROUND OF THE INVENTION

Trepanning is a procedure for providing a hole by cutting along a circular path, and removing the core surrounded by the path after the cutting operation has been completed. The practice is very old, and is used frequently in machining large-diameter holes, where it is more economical to machine away only the material along the circular path, rather than all the material within the hole. The procedure is also useful where it is desired to preserve the interior material.

After a hole has been trepanned, it is usually necessary to bore the hole to closer tolerance and finish than trepanning tools provided. The standard procedure in such cases would be to remove the trepanning tool and replace it with a boring bar of completely different design. In boring deep holes, the machinist must either use a starting bar to pre-bore the workpiece to a specific diameter and depth to engage the pilot of the final boring bar, or set up a support bushing to guide the bar as it enters the trepanned hole. The replacement of the trepanning unit with a boring bar obviously requires additional alignment and securing operations as the tools are successively placed in operating condition on the machine.

SUMMARY OF THE INVENTION

A trepanning tool is adapted to receive an attachment to perform boring operations by establishing diametrically-opposite driving surfaces on the outer end of the tubular body of the tool. These driving surfaces are preferably formed by machined recesses angularly spaced from the trepanning cutter. An adjustable boring attachment is fitted to these driving surfaces, and is secured in position. The boring attachment has adjustable locating blocks registering with the inside diameter of the trepanning unit, and these blocks can be shifted to maintain the transverse position of the boring attachment with respect to the axis of the trepanning unit. The attachment is preferably formed by overlapped bars and blocks that are adjustable with respect to each other to increase or decrease the cutting diameter of the boring bits carried by the blocks. The cutting diameter is established slightly in excess of that created by the trepanning cutter. A finish boring attachment may be installed for a subsequent boring operation in the same manner, with this latter attachment being provided with an adjustable degree of float to accommodate a self-centering action tending to produce an accurate and high-quality finish.

DESCRIPTION OF THE DRAWINGS

FIG. 1 is a side elevation of a trepanning unit with a boring attachment installed in operating position.

FIG. 2 is a left-end view with respect to FIG. 1.

FIG. 3 is a fragmentary view with respect to FIG. 2, showing the installation of a filler block in place of the boring attachment at the illustrated side of the unit.

FIG. 4 is a fragmentary unit of a filler block installed in place of the boring bar on the adjacent side of the unit illustrated in FIG. 2.

FIG. 5 is a perspective view of the boring attachment appearing in FIG. 2.

FIG. 23 is a plan view of a reference plate used in setting the instrument shown in FIGS. 19-22.

FIG. 24 is an end view of the reference unit shown on FIG. 23.

FIG. 25 is a fragmentary rear view of the device shown in FIG. 23.

DESCRIPTION OF THE PREFERRED EMBODIMENTS

Figure 6:
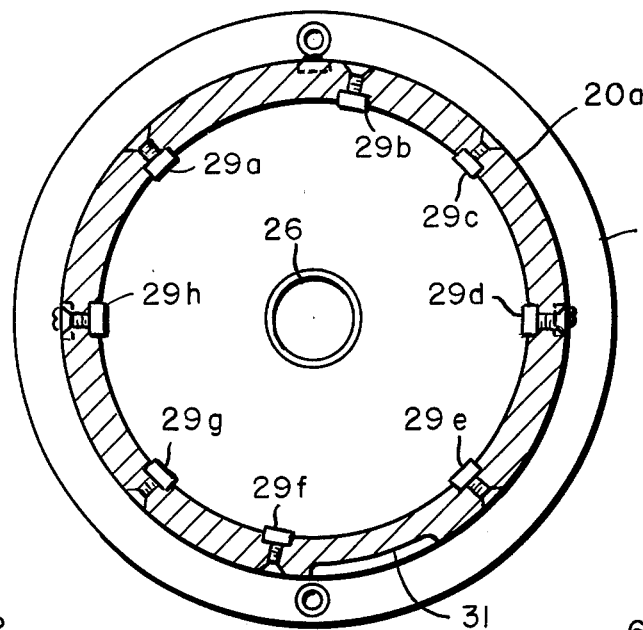
FIG. 6 is a section on the plane 6—6 of FIG. 1.
Figure 7:
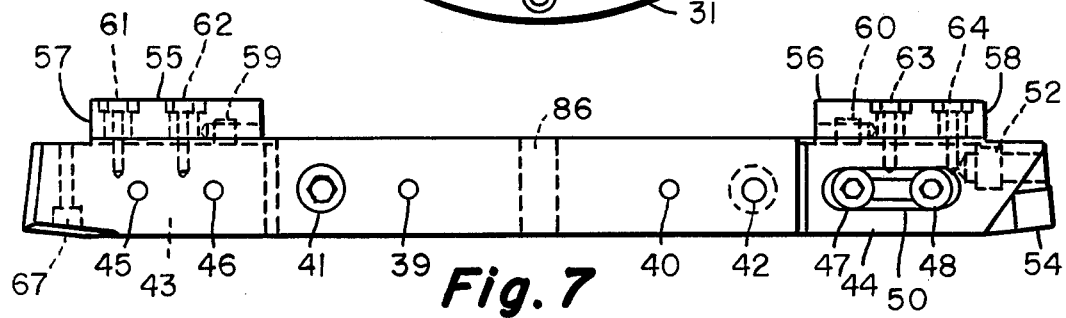
FIG. 7 is a plan view of the boring attachment shown in FIG. 5.
Figure 8:
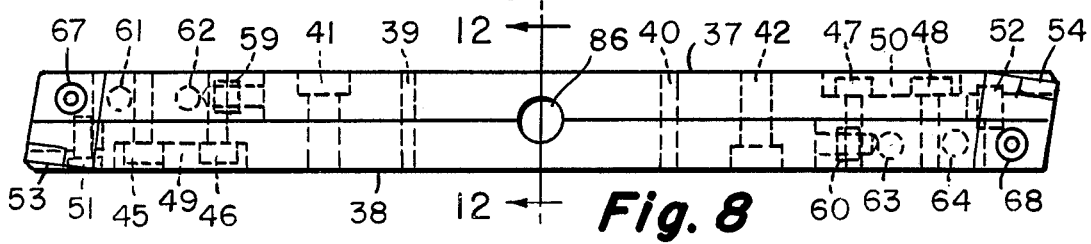
FIG. 8 is a front elevation of the boring attachment.
Figure 9:
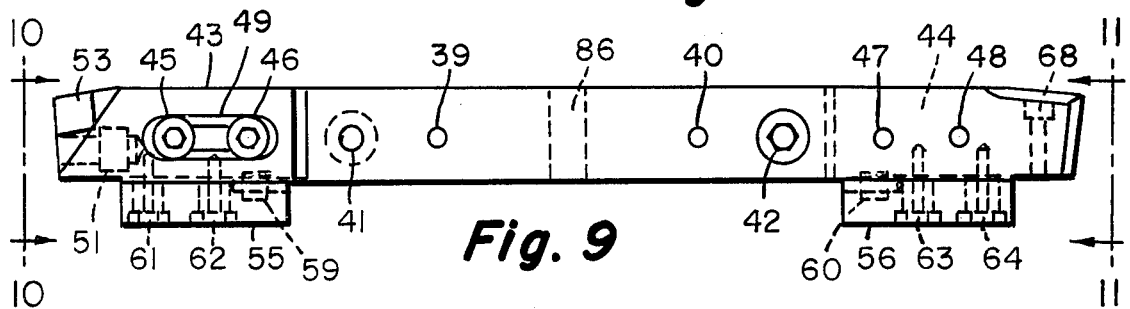
FIG. 9 is a view of the boring attachment opposite from that appearing in FIG. 7.
Figure 10:
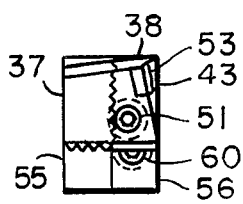
FIG. 10 is a left-end view of the boring attachment, with respect to FIG. 9.
Figure 11:
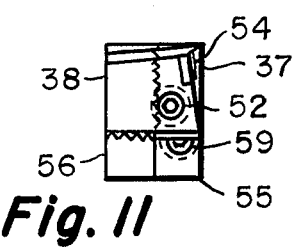
FIG. 11 is a right-end view of the attachment with respect to FIG. 9.
Figure 12:
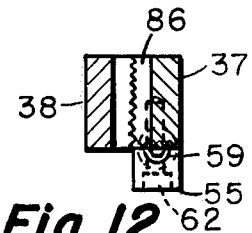
FIG. 12 is a section on the plane 12—12 of FIG. 8.

The trepanning and boring tool shown in FIG. 1 has a tubular body 20 formed by the coaxial sections 20a and 20b. These sections have a telescoping interengagement at 20c, and are held together by a group of screws 21 spaced around the periphery and indicated at 21a–b in FIG. 1. Access openings as shown at 22a and 22b in the body section 20a are provided for the installation of these screws. At the right end of the assembly, as shown in FIG. 1, the base 23 has a section 23a in close telescopic interengagement with the body section 20a to assure concentricity. The base and body section are welded together around the periphery at 24. The radial extension of the base 23 beyond the periphery of the body section 20 provides a convenient flange for mounting the tool on the driving face plate of a conventional machine. A locating extension 25 may be incorporated for registry with the corresponding recess in the driving machine. The central opening 26 through the base may be used for a variety of purposes, such as the injection of coolant, and the passage of a push-out bar for removing a trepanned core. A group of bearing inserts as shown at 27a–f in FIG. 1 are mounted on the periphery of the body section 20a for engagement with the workpiece during the boring operation. Similar inserts 28a–d on the body section 20b are provided for the same purpose. Bearing inserts 29a–h are secured to the inside of the body sections to support the core during the trepanning operation. These latter inserts are secured by flathead screws traversing the wall of the body sections, with the heads outside as shown. The trepanning cutter 30 is installed at one point at the left end of the assembly shown in FIG. 1, and a chip passage 31 extends from this cutter to a position adjacent the base of the unit. To this point, the structure thus described is conventional.

Referring to FIGS. 3 and 4, a pair of diametrically opposite recesses 32 and 33 are machined in the wall of the body section 20b, primarily to provide the driving surfaces 32a and 33a for interengagement with the boring attachment generally indicated at 34. When this attachment is not installed, it is preferable to install the filler blocks 35 and 36 to protect the driving surfaces. The filler blocks are preferably of the same contour as the recesses. Conceivably, the boring attachment 34 could simply be mounted directly on the end of the body section 20b, with appropriate screws and dowels. The provision of the integral driving surfaces formed by the recesses is much preferred. The boring attachment itself is illustrated in FIGS. 5 and 7 through 12. An adjustable diametral beam is formed by the overlapped bars 37 and 38. These bars are serrated along their mating surfaces in a direction parallel to the length to assure continuing alignment over the full range of adjustability. Once the adjustment has been obtained, it may be secured by the installation of dowels as shown at 39 and 40 traversing both bars, and held in engagement by screws as shown at 41 and 42. The bars do not overlap over their full length, leaving room for the cutter blocks 43 and 44. These are held in position by screws 45–46 and 47–48 traversing the elongated slots 49 and 50 in the blocks 43 and 44, respectively. Set screws as shown at 51 and 52 are received within threaded holes in the cutter blocks that are intersected by the plane of the mating surfaces of the blocks and the bars against which they rest. The sides of the set screws project into recesses machined in the respective bars. The recesses closely fit the set screws in a direction parallel to their axes. This is a standard adjustment arrangement, and rotation of the set screws will result in movement of the cutter blocks with respect to the bars, after which the screws 45–48 may be tightened to maintain the adjusted position. Cutting inserts of carbide are commonly provided on the cutter blocks to form the actual cutting surfaces. These are shown at 53 and 54.

The concentricity of the boring attachment shown in FIG. 5 with respect to the body of the trepanning tool is maintained by the locating blocks 55 and 56. These blocks, as well as the cutter blocks, have a serrated interengagement along the mating surfaces of the bars against which they rest. The blocks 55 and 56 provide locating surfaces 57 and 58 which are engageable with the inside surface of the tubular body section 20b to maintain the relative transverse position of the boring attachment. Adjusting screws 59 and 60 of the type previously described permit these blocks to be adjusted with respect to the bars 37 and 38. The screws 61–62 and 63–64 received in elongated holes in these locating blocks can then be tightened to secure the adjusted position. The entire attachment assembly shown in FIG. 5 is secured in the recesses 32 and 33 with screws as shown at 65 and 66 in FIG. 2. These screws are received in the holes 67 and 68 provided in the ends of the bars 37 and 38, respectively. The assembly shown in FIG. 5 is adjusted to provide a cutting diameter slightly in excess of that of the trepanned hole established by the cutter 30.

Figure 16:
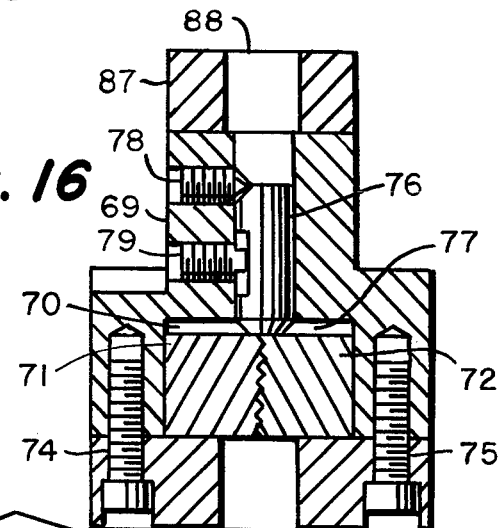
FIG. 16 is a section on an enlarged scale on the plane 16—16 of FIG. 14.

If it becomes desirable to provide particularly close finish tolerances, or an improved finish, the finish boring attachment illustrated in FIGS. 13–18 may be installed in place of the assembly shown in FIG. 5. This assembly is preferably of the floating type, in which the cutting elements position themselves through a self-centering action. A frame structure for this attachment is provided by the T-shaped bar 69. This bar has a groove 70 receiving the overlapped cutter bars 71 and 72. These are held within the groove by the cover plate 73 secured by screws as shown at 74 and 75 in FIG. 16. The bars 71 and 72 are serrated on their mating surfaces, and are provided with cutting inserts at their opposite ends. An adjusting set screw 76 of the type previously described controls the cutting diameter established by the assembly. The self-centering action is provided by the freedom of the interlocked bars 71 and 72 to slide within the slot 70 within the limits established by the centering pin 76. The beveled tip of this pin engages a notch 77 provided across both the bars 71 and 72, and the degree of entry of the pin into this notch controls the degree of float permitted to the cutting assembly. The pin 76 is driven into further engagement with the notch by tightening the set screw 78, the beveled end of which engages a correspondingly beveled surface at the upper end of the pin 76, as shown in FIG. 16. This arrangement for controlled float of a cutting tool is conventional. The adjusted position of the pin 76 is maintained by tightening the locking set screw 79 preferably engaging a machined flat on the side of the pin 76.

Figure 18:
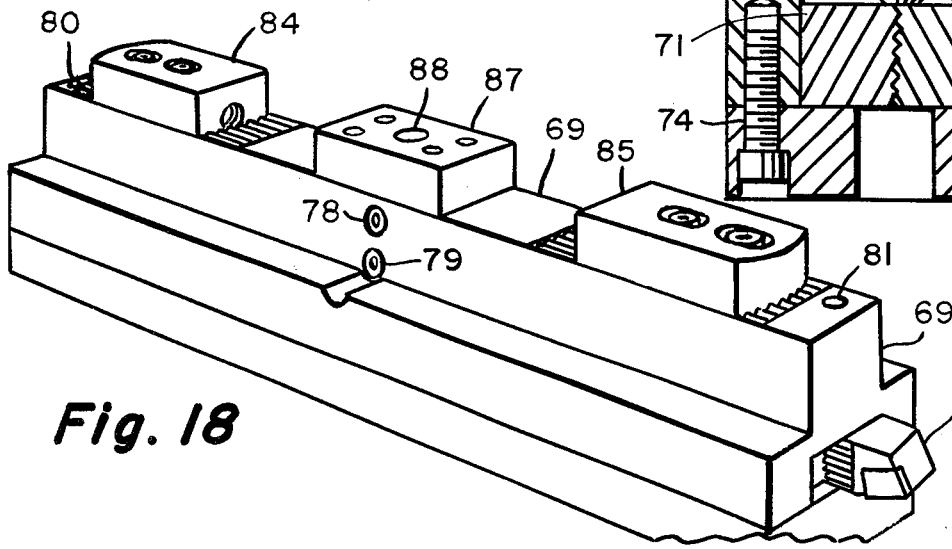
FIG. 18 is a perspective view of the finish boring attachment illustrated in FIGS. 13–17.
Figure 19:
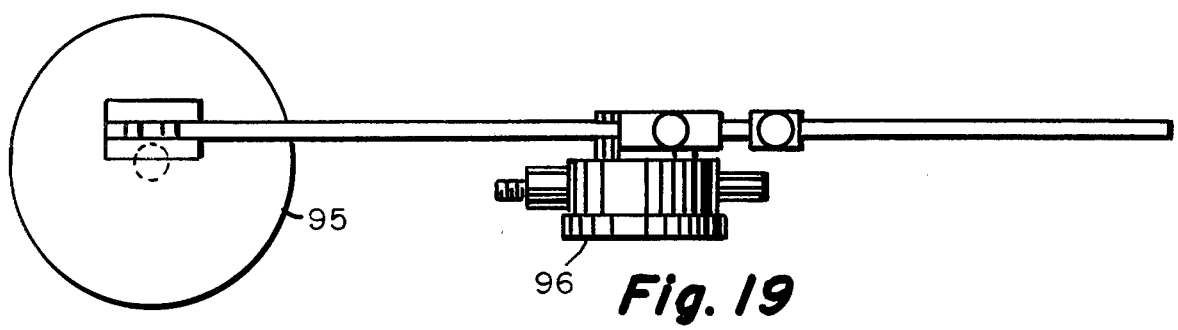
FIG. 19 is a top view of an indicating instrument used in setting the boring attachments.
Figure 20:
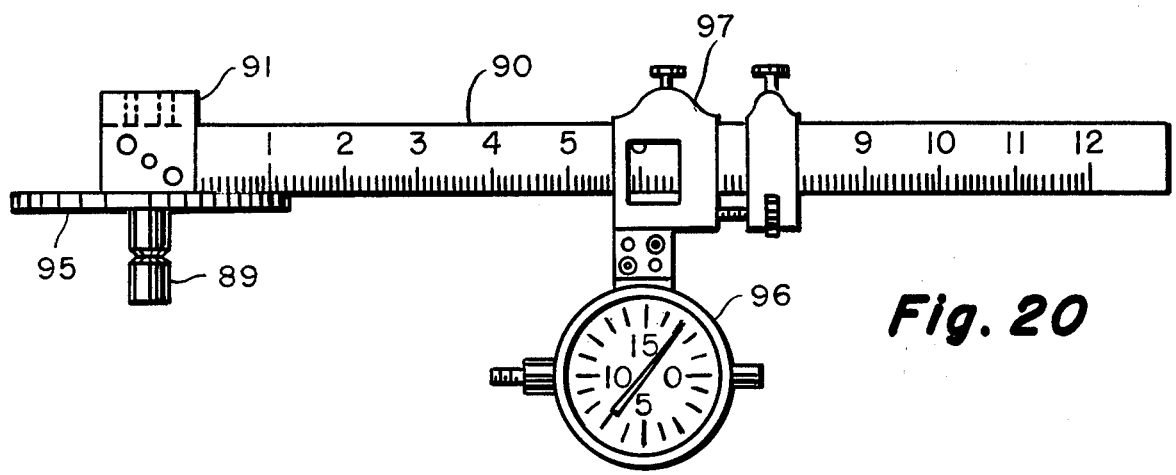
FIG. 20 is a plan view of the instrument shown in FIG. 19.
Figure 21:
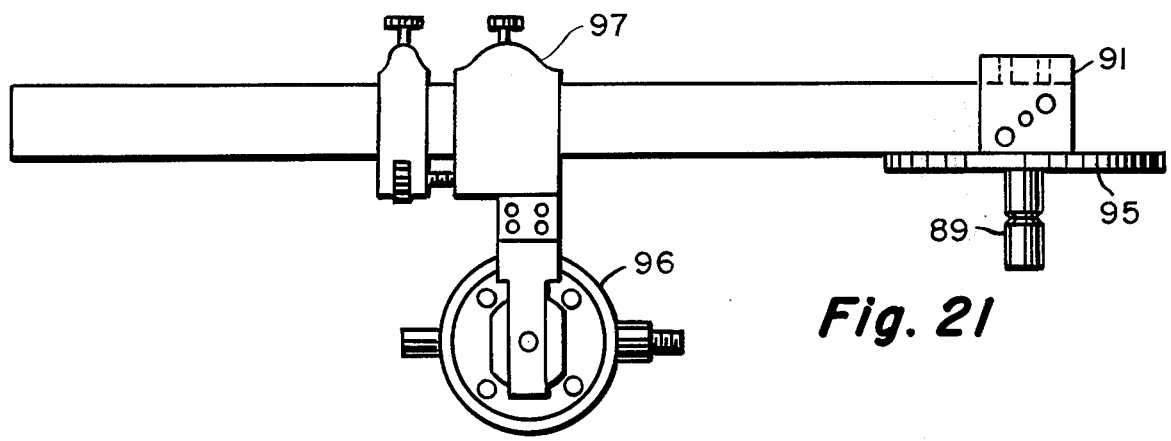
FIG. 21 is a rear view with respect to FIG. 20.
Figure 22:
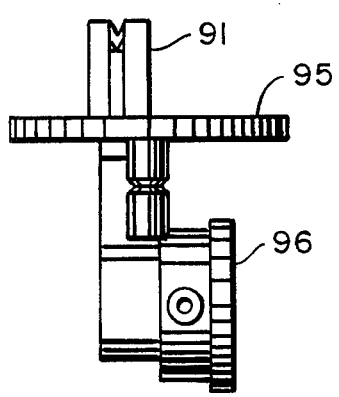
FIG. 22 is an end view with respect to FIG. 20.

The assembly shown in FIG. 18 is secured to the body section 20b in the same manner as is the assembly shown in FIG. 5. Screw holes are provided at 80 and 81 for engaging the same threaded holes in the wall of the body section 20b. Access to these holes is provided through the openings 82 and 83, which are used prior to insertion of the cutter bars 71 and 72. The frame structure of the unit shown in FIG. 18 is centered in the body section 20b by the presence of the adjustable locating blocks 84 and 85, of the type previously described.

Figure 13:
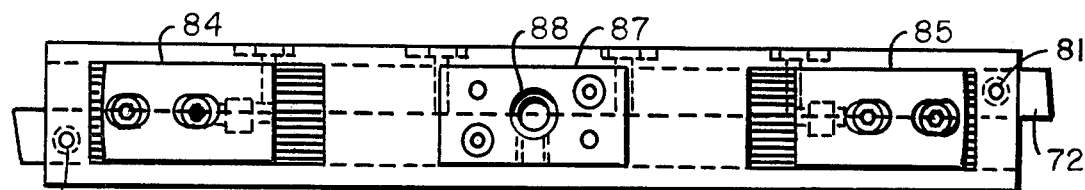
FIG. 13 is a rear view of a finish boring attachment.
Figure 14:
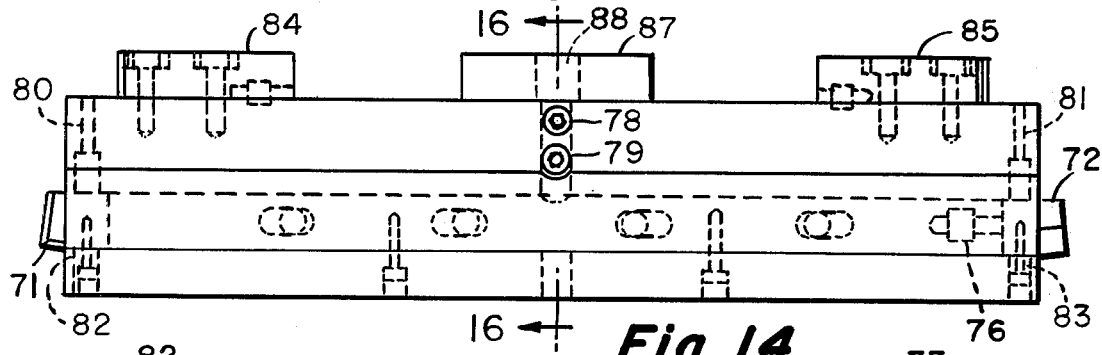
FIG. 14 is a plan view of the attachment illustrated in FIG. 13.
Figure 15:
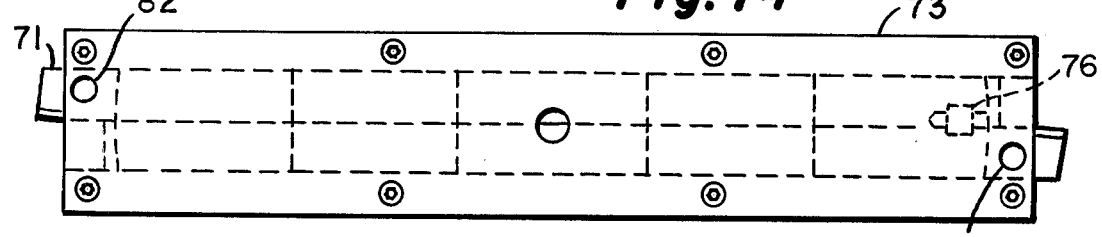
FIG. 15 is a front view of the attachment appearing in FIGS. 13 and 14.
Figure 17:
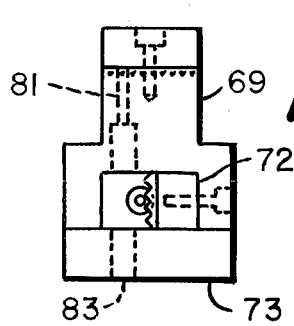
FIG. 17 is an end view with respect to FIG. 14.

The FIG. 5 assembly is provided with a reference hole 86, and the FIG. 18 assembly has the block 87 secured to the frame member to provide a corresponding reference hole 88. This block is secured by screws and dowels in a conventional manner, as shown in FIG. 13. The holes 86 and 88 are provided for registry with the member 89 of the measuring device shown in FIGS. 19–22. The locating blocks of both boring attachments may be positioned by using this device, which is essentially a modified height gage. The beam 90 is provided with a special attachment 91 carrying the member 89, and which is also engageable with the opening 92 in the gage plate 93. A boss 94 receives the flange 95 of the attachment 91, and the serrations around the periphery of the plate 93 represent gage distances from the opening 92 against which the indicator 96 can be positioned. This indicator is mounted on the carrier 97 of the height gage assembly. The boss 94 is accurately mounted on the plate 93 with the dowels 98–99 and the screws 100–103. The holes 104–106 may be provided in the plate to lighten the unit for easier handling. Once the indicating unit shown in FIGS. 19–22 is set to produce a particular reading, this reading may be transferred to the boring attachments to properly locate the centering blocks. This same procedure may also be used to check the cutting diameter, if desired, and with appropriate modification.

The features of the structure described above provide a number of advantages. Among these are the following:

1. The time spent for moving the trepanning tool, and replacing it with a conventional boring bar is saved.

2. After the boring operation, the time spent in removing the boring bar and re-setting the trepanning tool for the next trepanning operation is saved.

3. The workpiece remains in exactly the same position it occupied when it was trepanned. No time is wasted in removing it, and then replacing it and realigning it for boring.

4. The assembly provides a balanced device resulting from the presence of diametrically opposite cutting edges working simultaneously, thus eliminating deflection forces on the boring unit, and providing twice the feed rate that can be used with single-point tools.

We claim:

1. A trepanning and boring tool including a tubular body portion having trepanning cutting means mounted at an end of said body portion and adapted to cut along a circular path incompassing the axially-projected cross-sectional area of the wall of said body portion, wherein the improvement comprises:

a boring attachment removeably secured to said body portion, and disposed to cut on a diameter in excess of the diameter established by said trepanning cutting means.

2. A tool as defined in claim 1, wherein said attachment includes bar means removeably secured to opposite sides of said body portion and extending between said sides.

3. A tool as defined in claim 2, wherein said attachment includes boring cutter means adjustable along said bar means with respect to the distance thereof from the axis of said body portion.

4. A tool as defined in claim 3, wherein said attachment includes locating means engageable with an inside surface of said body portion.

5. A tool as defined in claim 4, wherein said locating means is radially adjustable with respect to said bar means.

6. A tool as defined in claim 1 wherein said body portion is provided with at least one recess adapted to receive a portion of said attachment, and said tool further includes a filler block removeably secured to said body portion to substantially fully occupy said recess during trepanning operations.

7. A tool as defined in claim 1, wherein said boring attachment includes a frame normally secured at substantially diametrically opposite positions adjacent the end of said body portion, and further includes cutting means mounted in said frame for limited sliding movement, said cutting means including adjustably interlocked oppositely extending members having cutting edges at the outer extremities thereof.

* * * * *